(12) United States Patent
Oka

(10) Patent No.: US 12,261,710 B2
(45) Date of Patent: Mar. 25, 2025

(54) INFORMATION PROCESSING APPARATUS AND METHOD AND NON-TRANSITORY COMPUTER READABLE MEDIUM

(71) Applicant: FUJIFILM Business Innovation Corp., Tokyo (JP)

(72) Inventor: Hirooki Oka, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 162 days.

(21) Appl. No.: 17/700,512

(22) Filed: Mar. 22, 2022

(65) Prior Publication Data

US 2023/0100755 A1 Mar. 30, 2023

(30) Foreign Application Priority Data

Sep. 24, 2021 (JP) .................................. 2021-156131

(51) Int. Cl.
*H04L 12/18* (2006.01)
*G10L 15/26* (2006.01)

(52) U.S. Cl.
CPC .......... *H04L 12/1831* (2013.01); *G10L 15/26* (2013.01); *H04L 12/1818* (2013.01); *H04L 12/1822* (2013.01)

(58) Field of Classification Search
None
See application file for complete search history.

(56) References Cited

U.S. PATENT DOCUMENTS

| | | | | |
|---|---|---|---|---|
| 10,542,126 B2 * | 1/2020 | Nayak | ................. | H04L 12/1831 |
| 10,972,295 B1 * | 4/2021 | van Rensburg | ........ | H04N 7/152 |
| 2008/0040187 A1 * | 2/2008 | Carraher | ............ | G06Q 10/1095 |
| | | | | 705/7.19 |
| 2014/0172967 A1 * | 6/2014 | Yeung | ................. | H04L 12/1818 |
| | | | | 709/204 |
| 2015/0200978 A1 * | 7/2015 | Putterman | ........... | H04L 12/1827 |
| | | | | 709/204 |
| 2015/0332219 A1 * | 11/2015 | Putterman | .......... | G06Q 10/1095 |
| | | | | 705/7.19 |

(Continued)

FOREIGN PATENT DOCUMENTS

| | | | | |
|---|---|---|---|---|
| JP | 2002099530 | | 4/2002 | |
| KR | 20220031170 A | * | 9/2020 | ......... H04L 12/1831 |
| TW | 202145775 A | * | 12/2021 | ........... G06F 3/0484 |

*Primary Examiner* — Phyllis A Book
(74) *Attorney, Agent, or Firm* — JCIPRNET

(57) ABSTRACT

An information processing apparatus includes a processor configured to: obtain, during an online meeting, when a participant has left halfway through the online meeting, an absent period of the participant and a remaining time of the online meeting, the absent period being a period of time for which the participant is absent after the participant has left the online meeting, the remaining time being a time from when the participant returns to the online meeting until an end time of the online meeting, the online meeting being a meeting conducted via a communication network; and switch a format of content presentation information to be presented to the participant having left halfway through the online meeting in accordance with a combination of the obtained absent period and the obtained remaining time, the content presentation information being information on content of the online meeting during the absent period of the participant.

17 Claims, 10 Drawing Sheets

(56) References Cited

U.S. PATENT DOCUMENTS

| | | | |
|---|---|---|---|
| 2016/0134570 A1* | 5/2016 | Yin | H04L 65/403 |
| | | | 709/204 |
| 2016/0283909 A1* | 9/2016 | Adiga | G06Q 10/1095 |
| 2016/0285929 A1* | 9/2016 | Oganezov | H04L 65/765 |
| 2017/0024699 A1* | 1/2017 | Millership | G06Q 20/26 |
| 2017/0064254 A1* | 3/2017 | Mueller | H04L 12/1831 |
| 2017/0371496 A1* | 12/2017 | Denoue | G06T 11/60 |
| 2018/0232705 A1* | 8/2018 | Baker | G06Q 10/103 |
| 2022/0217187 A1* | 7/2022 | Reynolds | H04L 65/1083 |
| 2023/0351806 A1* | 11/2023 | Norieda | G06V 40/176 |
| 2023/0367535 A1* | 11/2023 | Norieda | G06F 3/1454 |

\* cited by examiner

FIG. 3

| ABSENT PERIOD (MINUTES) | REMAINING TIME | SCHEDULED ABSENT TIME INTERVAL | PRESENTATION FORMAT |
|---|---|---|---|
| 0 TO LESS THAN 5 | LONG | N/A | DOCUMENTATION |
| 0 TO LESS THAN 5 | INTERMEDIATE | N/A | VOICE OUTPUT |
| 0 TO LESS THAN 5 | SHORT | N/A | NOT PRESENTED |
| 5 TO LESS THAN 15 | LONG | NO | SUMMARY 2 |
| 5 TO LESS THAN 15 | LONG | YES | SUMMARY 2 |
| 5 TO LESS THAN 15 | INTERMEDIATE | NO | SUMMARY 1 |
| 5 TO LESS THAN 15 | INTERMEDIATE | YES | SUMMARY 2 |
| 5 TO LESS THAN 15 | SHORT | NO | NOT PRESENTED |
| 5 TO LESS THAN 15 | SHORT | YES | SUMMARY 1 |
| 15 OR MORE | LONG | NO | SUMMARY 2 |
| 15 OR MORE | LONG | YES | SUMMARY 2 |
| 15 OR MORE | INTERMEDIATE | NO | SUMMARY 1 |
| 15 OR MORE | INTERMEDIATE | YES | SUMMARY 2 |
| 15 OR MORE | SHORT | NO | NOT PRESENTED |
| 15 OR MORE | SHORT | YES | NOT PRESENTED |

FIG. 4

| MEETING ID | START TIME | END TIME | SCHEDULED ABSENCE INFORMATION | | |
|---|---|---|---|---|---|
| | | | PARTICIPANT ID | ABSENCE START TIME | ABSENCE END TIME |
| M001 | 7/20/2021 13:00 | 7/20/2021 15:00 | P001 | 13:45 | 13:55 |
| | | | | 14:25 | 14:30 |
| | | | | ⋮ | ⋮ |
| | | | P002 | N/A | N/A |
| | | | P003 | ⋮ | ⋮ |
| | | | ⋮ | ⋮ | ⋮ |
| M002 | ⋮ | ⋮ | ⋮ | ⋮ | ⋮ |
| ⋮ | ⋮ | ⋮ | ⋮ | ⋮ | ⋮ |

INFORMATION PROCESSING APPARATUS AND METHOD AND NON-TRANSITORY COMPUTER READABLE MEDIUM

CROSS-REFERENCE TO RELATED APPLICATIONS

This application is based on and claims priority under 35 USC 119 from Japanese Patent Application No. 2021-156131 filed Sep. 24, 2021.

BACKGROUND

(i) Technical Field

The present disclosure relates to an information processing apparatus and method and a non-transitory computer readable medium.

(ii) Related Art

Japanese Unexamined Patent Application Publication No. 2002-099530 discloses a meeting-minutes creating device that creates the minutes of a meeting which enable a participant who has left halfway through a meeting to understand what other participants' have spoken during the absence of this participant.

This meeting-minutes creating device includes a voice input unit, a participant identifying unit, a voice signal storage, a voice signal converter, a meeting-minutes creator, and a meeting-minutes storage. The voice input unit converts information about what an individual participant has spoken in a meeting into a voice signal and inputs the converted voice signal. The participant identifying unit identifies the name of a participant having spoken in the meeting and the speaking time at which the participant has spoken and adds the participant name and the speaking time to a voice signal. The voice signal storage stores a voice signal of each participant having spoken in the meeting in association with the participant name and the speaking time. The voice signal converter converts a stored voice signal into text data. The meeting-minutes creator creates a summary of the meeting from the converted text data as the minutes of the meeting in accordance with a predetermined procedure. The meeting-minutes storage stores the minutes of the meeting including the participant name and the speaking time.

The meeting-minutes creating device also includes a display, a voice output unit, a recognizer, and a searcher. The display displays the minutes of the meeting on a screen. The voice output unit outputs the minutes of the meeting as voice information when necessary. The recognizer recognizes a participant having spoken in the meeting and having left halfway through the meeting and measures the time and time interval for which this participant has been absent from the meeting. When a participant has been absent from the meeting for a predetermined time or longer and returned to the meeting, the searcher searches the voice signal storage for a voice signal corresponding to information in the minutes of the meeting during the absence of this participant and outputs the voice signal to the voice output unit.

SUMMARY

Aspects of non-limiting embodiments of the present disclosure relate to an information processing apparatus and method and a non-transitory computer readable medium in which, when a participant has left halfway through a meeting, the content of the meeting during the absence of this participant can be presented appropriately, compared with when the content of the meeting is presented by disregarding the remaining time of the meeting.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to: obtain, during an online meeting, when a participant has left halfway through the online meeting, an absent period of the participant and a remaining time of the online meeting, the absent period being a period of time for which the participant is absent after the participant has left the online meeting, the remaining time being a time from when the participant returns to the online meeting until an end time of the online meeting, the online meeting being a meeting conducted via a communication network; and switch a format of content presentation information to be presented to the participant having left halfway through the online meeting in accordance with a combination of the obtained absent period and the obtained remaining time, the content presentation information being information on content of the online meeting during the absent period of the participant.

BRIEF DESCRIPTION OF THE DRAWINGS

Exemplary embodiments of the present disclosure will be described in detail based on the following figures, wherein:

FIG. 3 is a schematic diagram illustrating an example of the configuration of an absence-related information database used in the exemplary embodiments;

FIG. 4 is a schematic diagram illustrating an example of the configuration of a meeting-related information database used in the exemplary embodiments;

DETAILED DESCRIPTION

Exemplary embodiments of the disclosure will be described below in detail with reference to the accompanying drawings. In the exemplary embodiments, the disclosure is applied to an information processing system including plural terminal apparatuses used by individual users participating in a meeting conducted via a network (hereinafter called an online meeting or simply a meeting) and an information processing apparatus that centrally manages the online meeting. In the specification, a meeting means any type of meeting involving conversation conducted by plural participants, such as business meetings within a company or between companies, training sessions, seminars, and social gatherings regardless of with or without drinking.

First Exemplary Embodiment

Figure 1:
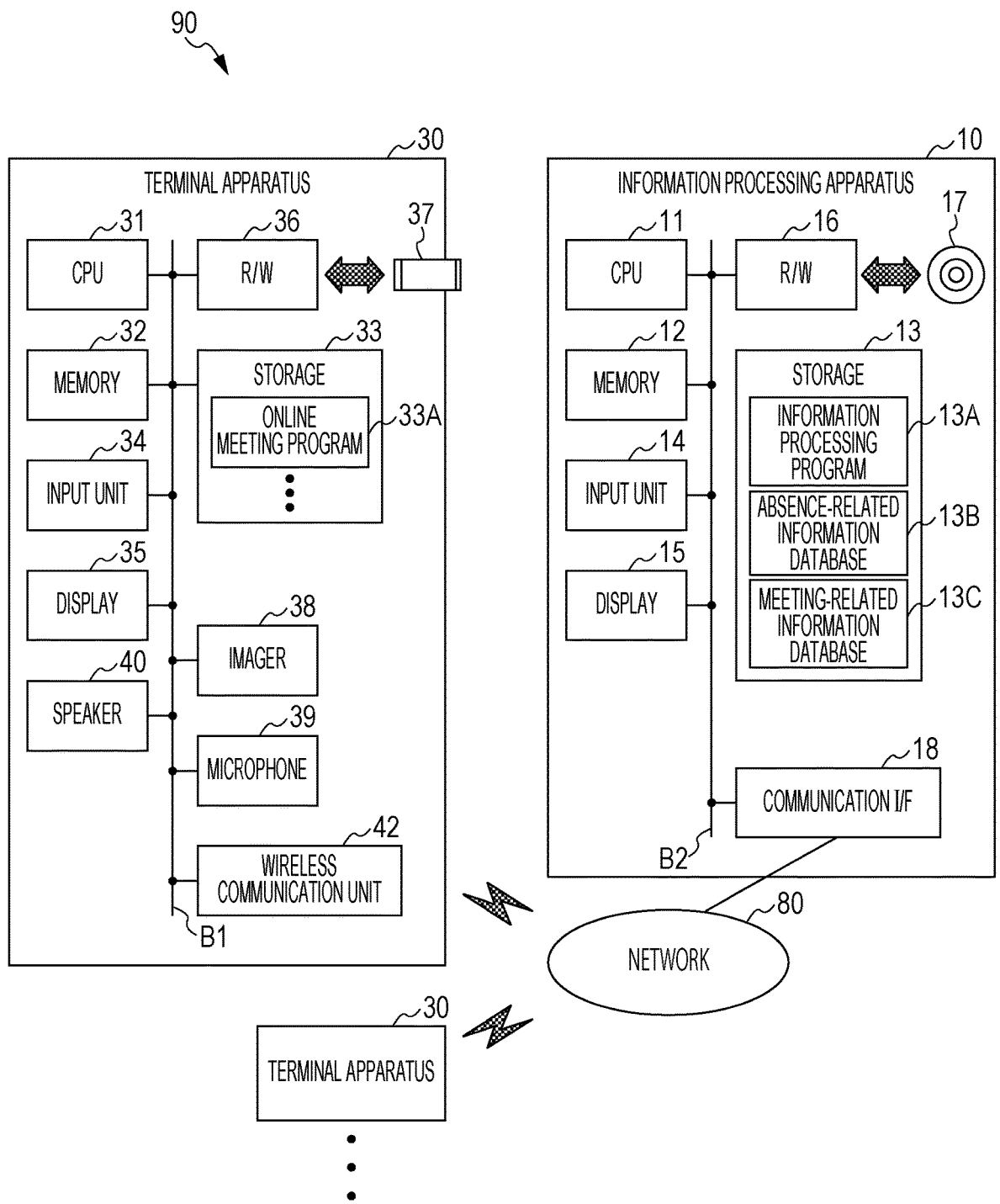
FIG. 1 is a block diagram illustrating an example of the hardware configuration of an information processing system according to the exemplary embodiments.
Figure 2:
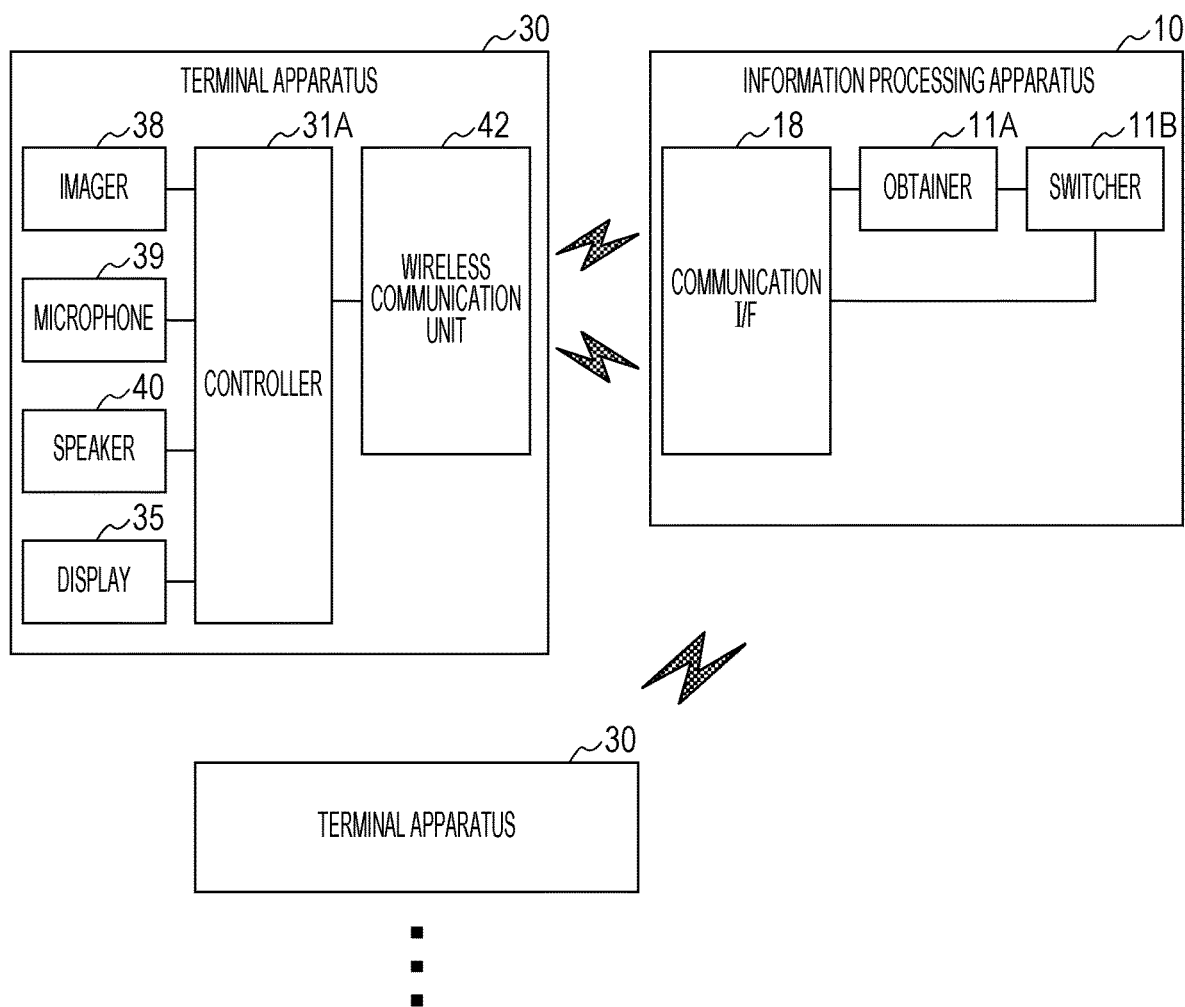
FIG. 2 is a block diagram illustrating an example of the functional configuration of the information processing system according to the exemplary embodiments.

The configuration of an information processing system 90 according to a first exemplary embodiment will first be described below with reference to FIGS. 1 and 2. FIG. 1 is a block diagram illustrating an example of the hardware configuration of the information processing system 90 according to the first exemplary embodiment. FIG. 2 is a block diagram illustrating an example of the functional configuration of the information processing system 90 according to the first exemplary embodiment.

As shown in FIG. 1, the information processing system 90 includes an information processing apparatus 10 and plural terminal apparatuses 30 that can be each connected to a network 80. Various types of computers, such as a personal computer and a server computer, for example, may be used as the information processing apparatus 10. As the terminal apparatuses 30, mobile devices, such as smartphones, tablet terminals, and personal digital assistants (PDAs), as well as the above-described various types of computers, for example, may be used. In the first exemplary embodiment, mobile devices are used as the terminal apparatuses 30.

The terminal apparatuses 30 are terminals used by individual participants in an online meeting managed by the information processing system 90 (hereinafter such participants simply called participants). Each terminal apparatus 30 includes a central processing unit (CPU) 31, a memory 32, which serves as a temporary storage region, a non-volatile storage 33, an input unit 34, such as a touchscreen, a display 35, such as a liquid crystal display, and a medium reader/writer (R/W) 36. The terminal apparatus 30 also includes an imager 38, a microphone 39, a speaker 40, and a wireless communication unit 42. The CPU 31, the memory 32, the storage 33, the input unit 34, the display 35, the medium reader/writer 36, the imager 38, the microphone 39, the speaker 40, and the wireless communication unit 42 are connected to each other via a bus B1. The medium reader/writer 36 reads information stored in a recording medium 37 and writes information into the recording medium 37.

The storage 33 is implemented by a hard disk drive (HDD), a solid state drive (SSD), or a flash memory, for example. An online meeting program 33A is stored in the storage 33, which serves as a storage medium. To store (install) the online meeting program 33A into the storage 33, the recording medium 37 storing the online meeting program 33A is set in the medium reader/writer 36 and the medium reader/writer 36 reads the online meeting program 33A from the storage medium 37. The CPU 31 reads the online meeting program 33A from the storage 33, loads it to the memory 32, and sequentially executes processes of the online meeting program 33A.

The imager 38 captures a video image of a participant and outputs image information obtained from the captured video image. The microphone 39 picks up voice generated from the participant and outputs voice information. The speaker 40 plays back voice represented by the voice information.

The information processing apparatus 10, which plays a major role in the information processing system 90, centrally manages an online meeting managed by the information processing system 90 (hereinafter, such an online meeting will be simply called an online meeting or a meeting), as discussed above. The information processing apparatus 10 includes a CPU 11, a memory 12, which serves as a temporary storage region, a non-volatile storage 13, an input unit 14, such as a keyboard and a mouse, a display 15, such as a liquid crystal display, a medium reader/writer 16, and a communication interface (I/F) 18. The CPU 11, the memory 12, the storage 13, the input unit 14, the display 15, the medium reader/writer 16, and the communication I/F 18 are connected to each other via a bus B2. The medium reader/writer 16 reads information stored in a recording medium 17 and writes information into the recording medium 17.

The storage 13 is implemented by an HDD, an SSD, or a flash memory, for example. Various programs such as an information processing program 13A are stored in the storage 13, which serves as a storage medium.

To store (install) various programs such as the information processing program 13A into the storage 13, the recording medium 17 storing the various programs is set in the medium reader/writer 16 and the medium reader/writer 16 reads the programs from the storage medium 17. The CPU 11 reads these programs from the storage 13, loads them to the memory 12, and sequentially executes processes of the programs.

In the storage 13, an absence-related information database 13B and a meeting-related information database 13C are stored. The absence-related information database 13B and a meeting-related information database 13C will be discussed later in detail.

In the first exemplary embodiment, a public communication network, such as the internet or a telephone line network, is used as the network 80. However, another type of network may be used as the network 80. For example, an in-house communication network, such as a local area network (LAN) or a wide area network (WAN), or a combination of an in-house communication network and a public communication network may be used as the network 80.

The functional configurations of the information processing apparatus 10 and the terminal apparatus 30 according to the first exemplary embodiment will now be described below with reference to FIG. 2.

As shown in FIG. 2, the terminal apparatus 30 includes a controller 31A. The CPU 31 functions as the controller 31A by executing the online meeting program 33A.

The controller 31A performs control so that the imager 38 images a participant and the microphone 39 picks up voice of participants. The controller 31A also performs control so that the speaker 40 plays back voice, the display 35 displays various information, and the wireless communication unit 42 performs communication with the information processing apparatus 10. The controller 31A also executes various control operations for conducting an online meeting.

As shown in FIG. 2, the information processing apparatus 10 includes an obtainer 11A and a switcher 11B. The CPU 11 functions as the obtainer 11A and the switcher 11B by executing the information processing program 13A.

During an online meeting, if a participant has left halfway through the meeting, the obtainer 11A obtains the period of time for which the participant is absent after he/she has left the meeting (hereinafter simply called the absent period) and the remaining time from when the participant returns to the meeting until the end of the meeting (hereinafter simply called the remaining time).

In accordance with a combination of the absent period and the remaining time obtained by the obtainer 11A, the switcher 11B switches the format of content presentation information to be presented to the participant having left halfway through the meeting. The content presentation information is information on the content of the online meeting during the absent period of the participant. Hereinafter, such information will simply be called content presentation information.

In the first exemplary embodiment, the format of content presentation information includes a format of voice generated during the absent period (voice format), a format of a document formed from this voice (document format), a format of a summary made from this document (summary format), and a format of the minutes of the meeting including the summary appended with information on who and when having spoken in the meeting (meeting minutes format). The content presentation information is not necessarily limited to the above-described format. For example, the format of content presentation information may include only one of the above-described four formats or include a combination of two or three of the four formats.

In the first exemplary embodiment, in addition to the above-described four formats, the format of content presentation information also includes a format in which the content presentation information is not presented (not-presented format). If the remaining time is shorter than a predetermined threshold (five minutes in the first exemplary embodiment) and if the absent period is shorter than a predetermined threshold (five minutes in the first exemplary embodiment), the switcher 11B selects the format in which the content presentation information is not presented. The condition for selecting this format is not limited to the above-described condition. In another mode, for example, when the remaining time is simply shorter than the predetermined threshold, the switcher 11B may select this format.

The obtainer 11A detects the time at which a participant has left halfway through the meeting (may be called the absence start time) and the time at which the participant has returned to the meeting (may be called the absence end time), and determines the absent period and the remaining time by using the detected absence start time and absence end time.

The obtainer 11A detects the absence start time and the absence end time of the participant in response to receiving the specifying of the absence start time and the absence end time from the participant. The obtainer 11A receives the specifying of the absence start time and the absence end time from the participant via a user interface screen displayed on the display 35.

In this manner, in the first exemplary embodiment, the obtainer 11A detects the absence start time and the absence end time of a participant in response to receiving the specifying of these times from the participant. However, this is only an example. In another mode, the absence start time and the absence end time of a participant may be detected automatically. For example, if the participant is not in images captured by the imager 38 for a predetermined period of time (30 seconds, for example) or longer, it may be assumed that this participant has left the meeting, and the start time and the end time of the period for which the participant is not in the images may be set to be the time at which the participant has left halfway through the meeting and the time at which the participant has returned to the meeting, respectively.

The obtainer 11A receives in advance a scheduled time interval for which the participant is planning to be absent from the meeting and determines the absent period and the remaining time by using this scheduled time interval. In this case, the absent period and the remaining time can be determined before the participant returns to the meeting, and the switcher 11B starts creating content presentation information while the participant is absent.

In the first exemplary embodiment, the obtainer 11A identifies the end time of an online meeting in response to receiving a scheduled time interval of this online meeting from the administrator of the information processing system 90. However, the obtainer 11A may obtain the end time of the online meeting in another manner.

Additionally, as the absent period is longer and as the remaining time is longer, the switcher 11B uses, for content presentation information, information in a format that requires a longer processing time to create.

The absence-related information database 13B used in the first exemplary embodiment will be explained below with reference to FIG. 3. FIG. 3 is a schematic diagram illustrating an example of the configuration of the absence-related information database 13B.

The absence-related information database 13B used in the first exemplary embodiment is a database that defines the presentation format of content presentation information to be presented to a participant having left halfway through a meeting when this participant has returned to the meeting. As shown in FIG. 3, in the absence-related information database 13B, individual items of information: the absent period, remaining time, scheduled absent time interval, and presentation format are stored in association with each other.

The absent period is information indicating the above-described absent period. The remaining time is information indicating the above-described remaining time. The scheduled absent time interval is information indicating whether the time interval for which a participant is planning to be absent from a meeting is specified in advance. The presentation format is information indicating the format of content presentation information to be presented to a participant having left halfway through a meeting in accordance with a combination of the associated absent period, remaining time, and scheduled absent time interval.

In the first exemplary embodiment, the absent period is categorized as three levels: 0 to less than 5 minutes, 5 to less than 15 minutes, and 15 minutes or more. However, this mode of categorization is only an example. In another mode, for example, the increments in each level of the absent period may be set differently from those shown in FIG. 3. The number of levels may be other than three.

In the first exemplary embodiment, the remaining time is categorized as three levels: 0 to less than 5 minutes is set to be a short period (indicated by "SHORT" in FIG. 3), 5 to less than 10 minutes is set to be an intermediate period (indicated by "INTERMEDIATE" in FIG. 3), and 10 minutes or more is set to be a long period (indicated by "LONG" in FIG. 3). However, this categorization is only an example. In another mode, for example, the increments in each level of the remaining time may be set differently from those shown in FIG. 3. The number of levels may be other than three.

In the first exemplary embodiment, as the scheduled absent time interval, three items of information are applicable: the scheduled absent time interval is specified (indicated by "YES" in FIG. 3), the scheduled absent time interval is not specified (indicated by "NO" in FIG. 3), and whether or not the scheduled absent time interval is specified does not influence the presentation format (indicated by "N/A" in FIG. 3).

In the first exemplary embodiment, as the presentation format, five items of information: "VOICE OUTPUT", "DOCUMENTATION", "SUMMARY 1", "SUMMARY 2", and "NOT PRESENTED" are applicable. "VOICE OUTPUT" corresponds to the above-described voice format; "DOCUMENTATION" corresponds to the above-described document format; "SUMMARY 1" corresponds to the above-described summary format; "SUMMARY 2" corresponds to the above-described meeting minutes format; and "NOT PRESENTED" corresponds to the above-described not-presented format. The presentation format is not limited to a combination of these five items of information, as described above.

In the example in FIG. 3, for example, when the absent period is 0 to less than 5 minutes and when the remaining time is "INTERMEDIATE", the content presentation information is presented to a participant having left halfway through the meeting in the form of "VOICE OUTPUT" regardless of whether the scheduled absent time interval is specified.

In the absence-related information database 13B shown in FIG. 3, when the absent period is as short as less than 5 minutes, it is assumed that the meeting does not proceed considerably. Priority is thus given to saving the time taken to create content presentation information over the ease of understanding for the absent participant, and a summary is not formed. When the absent period is less than 5 minutes and the remaining time is "SHORT", there is not much point of returning to the meeting, and content presentation information is not presented.

In the absence-related information database 13B shown in FIG. 3, when the absent period is 5 to less than 15 minutes and the remaining time is "LONG", there is a considerable time left before the meeting is over. Priority is thus given to the ease of understanding for the absent participant over saving the time taken to create content presentation information, and "SUMMARY 2", that is, the minutes of the meeting, are formed.

In the absence-related information database 13B shown in FIG. 3, when the absent period is more than 15 minutes and the remaining time is "SHORT", it is highly likely that meeting will be over before the absent participant understands the content of the meeting. The absent participant thus likely finds it more practical to read the proper minutes of the meeting after the meeting is over, and content presentation information is not presented.

The meeting-related information database 13C used in the first exemplary embodiment will now be explained below with reference to FIG. 4. FIG. 4 is a schematic diagram illustrating an example of the configuration of the meeting-related information database 13C used in the first exemplary embodiment.

The meeting-related information database 13C is a database for registering information concerning an online meeting. As shown in FIG. 4, in the meeting-related information database 13C, items of information: the meeting identification (ID), start time, end time, and scheduled absence information, are stored in association with each other.

The meeting ID is information appended to an individual online meeting for uniquely identifying this meeting. The start time and the end time are information indicating the scheduled start time and date and the scheduled end time and date, respectively, of the associated online meeting, and correspond to the above-described scheduled time interval of the associated online meeting.

The scheduled absence information is information about an absence schedule of an individual participant of the associated online meeting. As shown in FIG. 4, the scheduled absence information includes three items of information: the participant ID, the absence start time, and the absence end time. The participant ID is information appended to an individual participant for uniquely identifying this participant. The absence start time is information indicating the scheduled time at which the associated participant leaves halfway through the meeting, while the absence end time is information indicating the scheduled time at which the associated participant returns to the meeting. A combination of the absence start time and the absence end time corresponds to the above-described scheduled absent time interval.

In the example in FIG. 4, an online meeting appended with the meeting ID "M001" is scheduled to take place from 13:00 to 15:00 on Jul. 20, 2021. In this online meeting, the participant appended with the participant ID "P001" is planning to leave the meeting from 13:45 to 13:55.

In the first exemplary embodiment, a participant in an online meeting registers scheduled absence information in the meeting-related information database 13C by himself/herself before the start of this online meeting. However, this is only an example. In another example, the administrator of the information processing system 90 may receive an absence schedule of each participant and register the received absence schedules in the meeting-related information database 13C.

Figure 5:
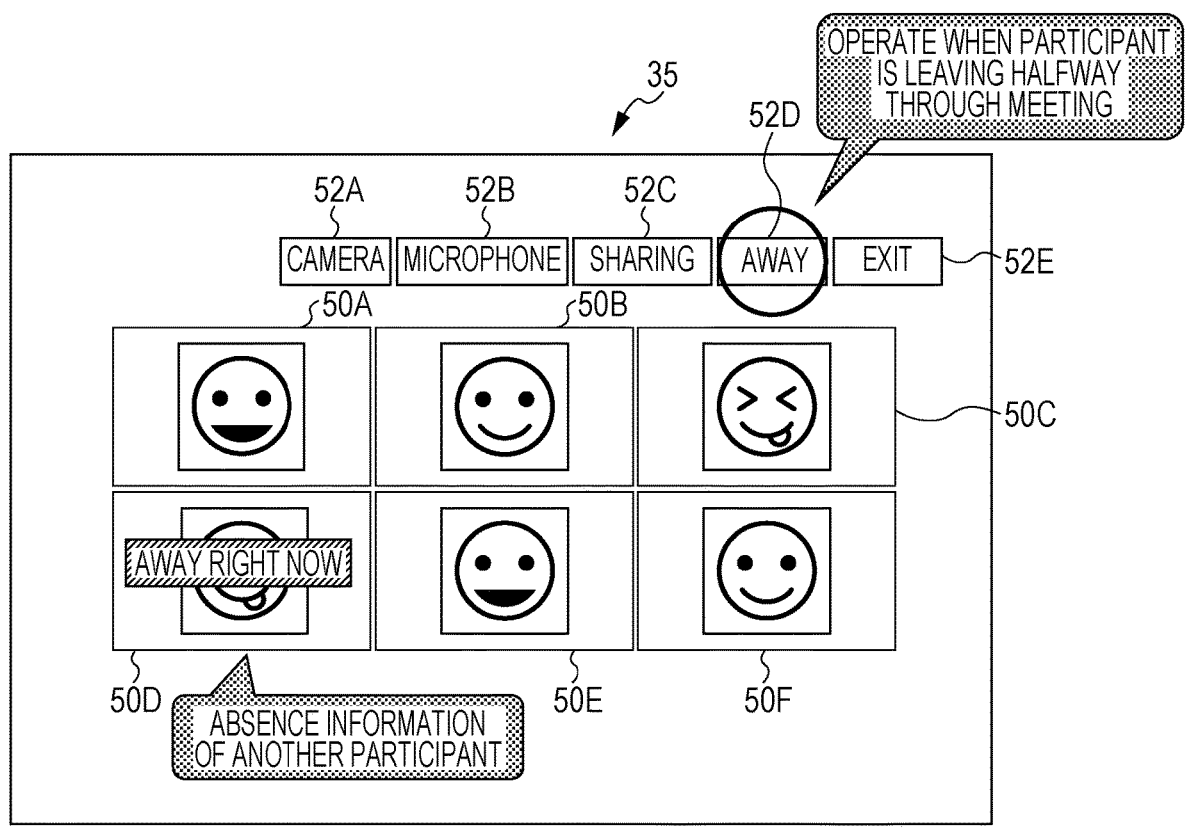
FIG. 5 is a front view illustrating an example of an online meeting display screen used in the exemplary embodiments.
Figure 6:
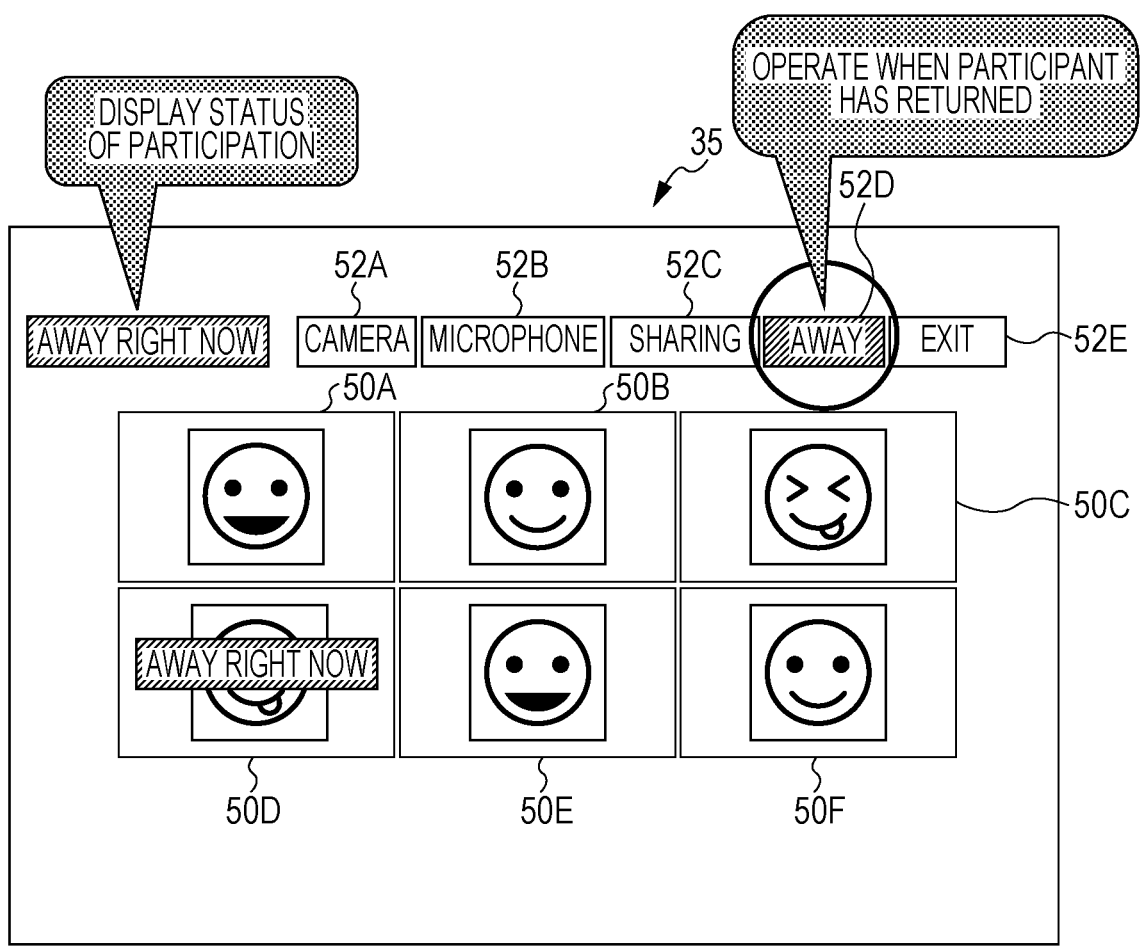
FIG. 6 is a front view illustrating another example of the online meeting display screen used in the exemplary embodiments.

A description will now be given, with reference to FIGS. 5 and 6, of how to specify that a participant is leaving halfway through an online meeting. FIG. 5 is a front view illustrating an example of an online meeting display screen used in the first exemplary embodiment. FIG. 6 is a front view illustrating another example of the online meeting display screen used in the first exemplary embodiment.

In the information processing system 90 of the first exemplary embodiment, to conduct an online meeting, the CPU 31 of the terminal apparatus 30 of a participant executes the online meeting program 33A. Then, the online meeting display screen shown in FIG. 5, for example, is displayed on the display 35 of the terminal apparatus 30.

As shown in FIG. 5, on the online meeting display screen, images 50A through 50F of individual participants taken by the imagers 38 of the terminal apparatuses 30 are displayed in real time. On the top right side of this online meeting display screen, five operation buttons: a camera button 52A, a microphone button 52B, a sharing button 52C, an away button 52D, and an exit button 52E, are displayed. In FIG. 5, an example in which the participant indicated by the image 50D has left halfway through the online meeting is shown.

If a participant wishes to leave halfway through the online meeting, he/she operates the away button 52D by using the input unit 34 when leaving the meeting.

In response to this operation, as shown in FIG. 6, information indicating that the participant indicated by the image 50D has left halfway through the meeting (indicated by "AWAY RIGHT NOW" in FIG. 6), for example, is displayed on the top left side of the online meeting display screen on the terminal apparatus 30 of this participant. By looking at this online meeting display screen, the participant can identify that having specified that he/she is leaving halfway through the meeting has been received.

In this case, on the online meeting display screens displayed on the terminal apparatuses 30 of all the participants including the participant having left the meeting, information indicating that this participant has left halfway through the meeting (indicated by "AWAY RIGHT NOW" in FIG. 5), which is similar to that displayed on the top left side of the online meeting display screen of this participant, is displayed at the center of the image 50D of this participant. The participants other than that having left the meeting can identify whether any other participant has left halfway through the meeting, or, if any, who has left the meeting, by looking at the online meeting display screens displayed on the terminal apparatuses 30 of these participants.

When the participant having left the meeting is returned, he/she operates the away button 52D again by using the input unit 34.

In response to this operation, on the online meeting display screen displayed on the terminal apparatus 30 of this participant, information that the participant has left halfway through the meeting on the top left side of the online meeting display screen is erased. Also, in response to this operation, on the online meeting display screen displayed on the display apparatus 30 of each participant, information that the participant has left halfway through the meeting displayed at the center of the image of this participant is erased. By looking at the online meeting display screen displayed of this participant, the participant can identify that having specified that he/she has returned to the meeting has been received. At the same time, by looking at the online meeting display screens of the participants other than this participant, they can recognize that the absent participant has returned.

In the information processing system 90 of the first exemplary embodiment, when, during an online meeting, a participant has operated the away button 52D on the online meeting display screen displayed on the terminal apparatus 30 of this participant, the terminal apparatus 30 sends information indicating that the participant has left halfway through the meeting (hereinafter called absence start information) to the information processing apparatus 10. In the information processing system 90 of the first exemplary embodiment, when a participant having left the meeting has operated the away button 52D again on the online meeting display screen displayed on the terminal apparatus 30 of this participant, the terminal apparatus 30 sends information indicating that the participant has returned to the meeting (hereinafter called absence end information) to the information processing apparatus 10. However, this mode is only an example. In another mode, for example, the information processing apparatus 10 may proactively detect the absence situations of individual participants in an online meeting by using certain information, such as images taken by the terminal apparatuses 30 of the individual participants.

In the information processing system 90 of the first exemplary embodiment, during an online meeting, if necessary, the information processing apparatus 10 stores in the storage 13 voice information representing the content of remarks, statements, and speech (hereinafter may collectively be called speech) made by participants in this meeting. Hereinafter, such information will be called speech information. Speech information is stored in the storage 13 in association with information on who has spoken (indicated by the participant ID in the first exemplary embodiment and hereinafter called speaker information) and information on when the participant has spoken (hereinafter called time-and-date information). However, this mode is only an example. In another mode, for example, the terminal apparatus 30 of a speaker participant may store therein speech information, speaker information, and time-and-date information in association with each other, and the information processing apparatus 10 may obtain these items of information from the terminal apparatus 30 when necessary.

Figure 7:
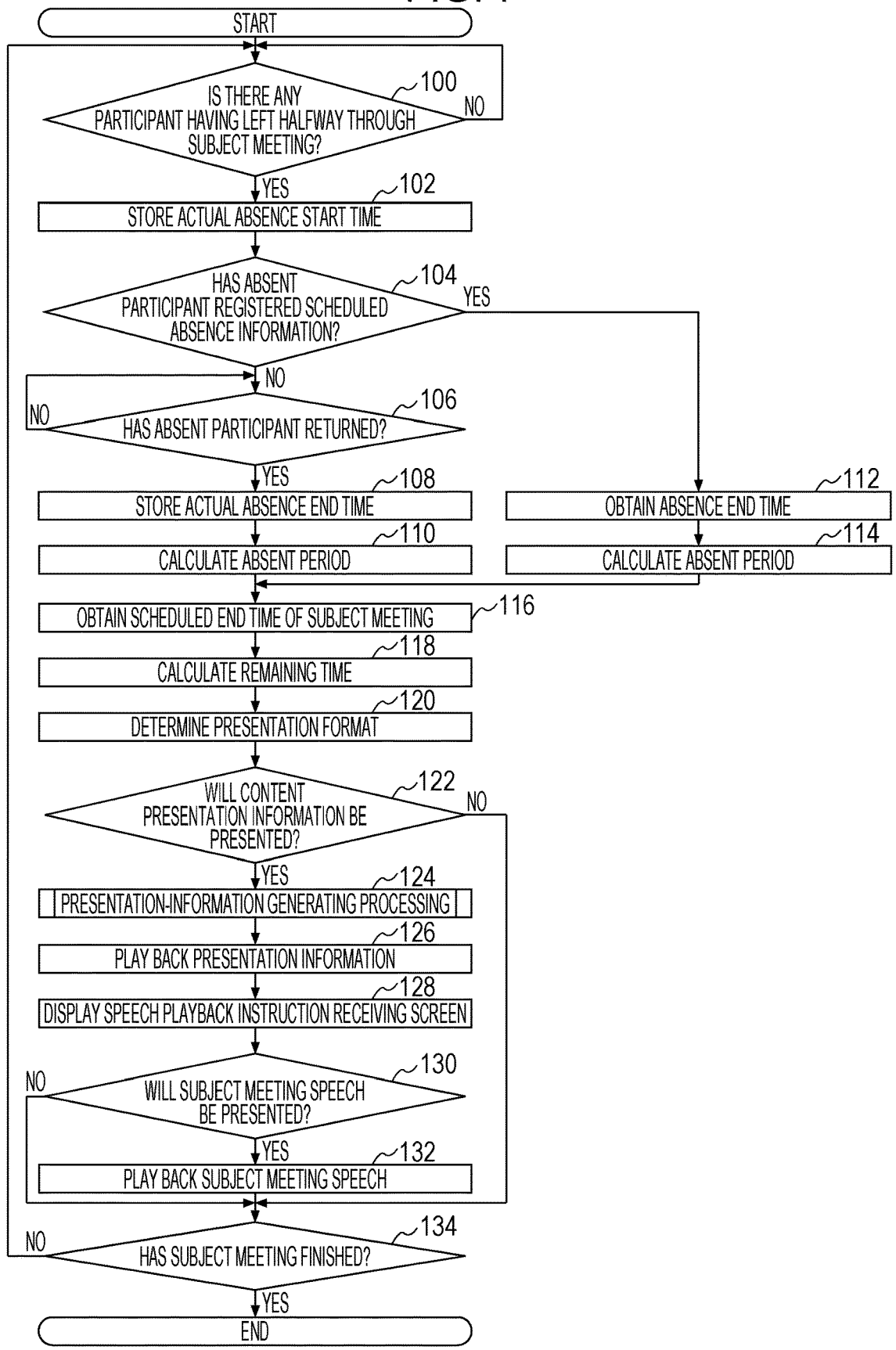
FIG. 7 is a flowchart illustrating an example of information processing according to a first exemplary embodiment.
Figure 8:
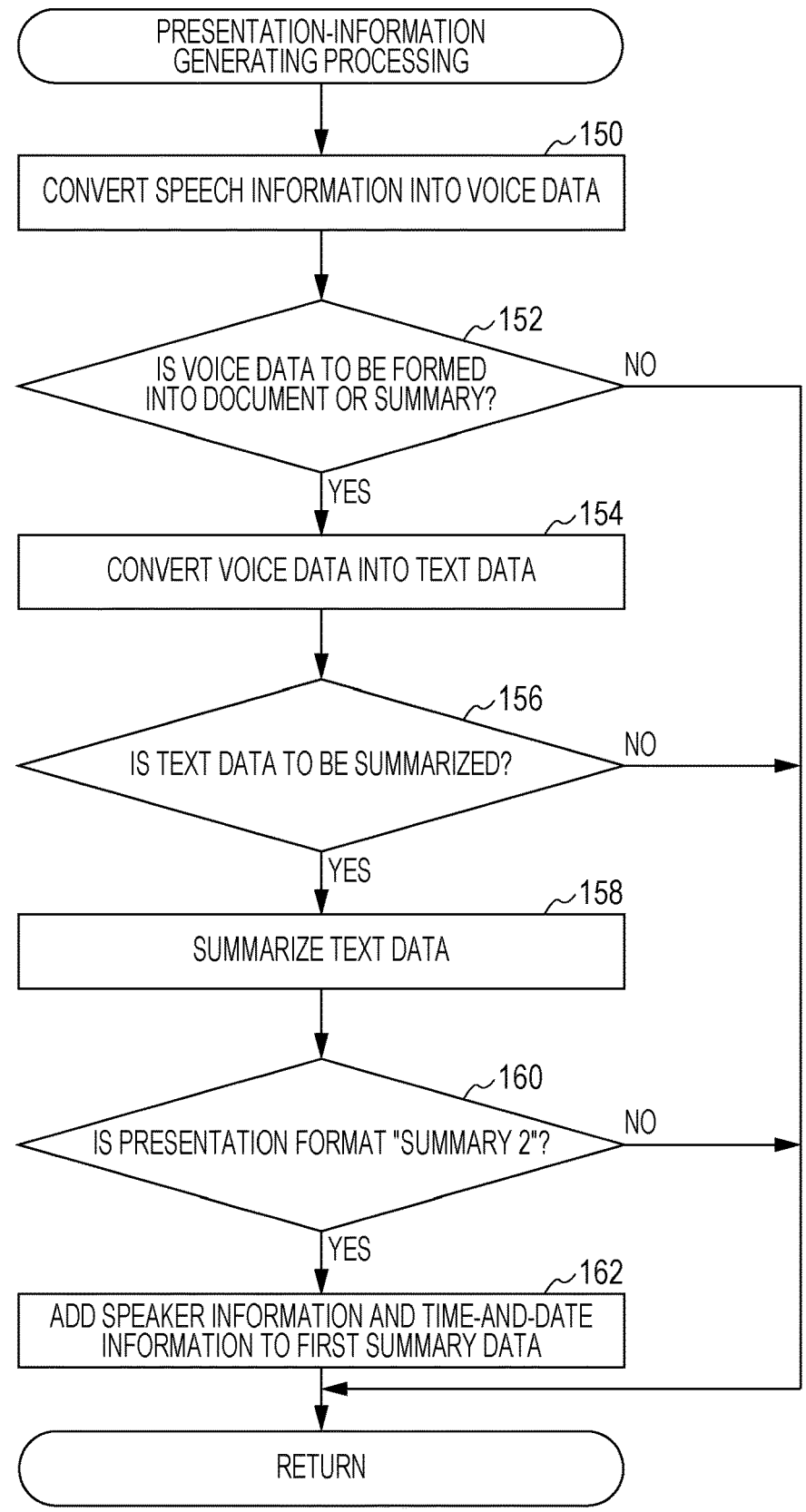
FIG. 8 is a flowchart illustrating an example of presentation-information generating processing according to the exemplary embodiments.

As the operation of the information processing system 90 according to the first exemplary embodiment, the operation of the information processing apparatus 10 will be described below with reference to FIGS. 7 and 8. FIG. 7 is a flowchart illustrating an example of information processing according to the first exemplary embodiment. FIG. 8 is a flowchart illustrating an example of presentation-information generating processing according to the first exemplary embodiment. For the sake of avoiding the complexity, a description will be given only of processing to be executed when a participant has left halfway through an online meeting, while an explanation of processing regarding the online meeting itself will be omitted. For the sake of avoiding the complexity, processing will be described, assuming that only one participant leaves halfway through the online meeting during the same time interval and that the absence-related information database 13B and the meeting-related information database 13C have been constructed.

At a start timing of one of the online meetings managed by the information processing system 90 (such an online meeting will be called a subject meeting), the CPU 11 of the information processing apparatus 10 executes the information processing program 13A. Information processing shown in FIG. 7 is then started.

In FIG. 7, in step 100, the CPU 11 waits until absence start information is received from the terminal apparatus 30 of one of the participants in the subject meeting, that is, until one of the participants has left halfway through the subject meeting. In step 102, the CPU 11 stores in the storage 13 the time at which the absence start information has been received as the actual absence start time. In step 104, the CPU 11 refers to the meeting-related information database 13C and judges whether the participant having left halfway through the meeting (hereinafter called the absent participant) has registered scheduled absence information corresponding to the actual absence start time in the meeting-related information database 13C. If the result of step 104 is NO, the CPU 11 proceeds to step 106.

In step 106, the CPU 11 waits until absence end information is received from the terminal apparatus 30 of the absent participant, that is, until the absent participant has returned to the subject meeting. In step 108, the CPU 11 stores in the storage 13 the time at which the absence end information has been received as the actual absence end time.

In step 110, the CPU 11 calculates the time difference between the actual absence start time and the actual absence end time stored in the storage 13 so as to determine the period of time for which the absent participant is absent from the subject meeting (hereinafter called the absent period). The CPU 11 then proceeds to step 116.

If the result of step 104 is YES, that is, if the absent participant has registered the corresponding scheduled absence information in the meeting-related information database 13C, the CPU 11 proceeds to step 112. In step 112, the CPU 11 reads from the meeting-related information database 13C the absence end time indicated by the scheduled absence information within the time interval including the actual absence start time. In step 114, the CPU 11 calculates the time difference between the actual absence start time stored in the storage 13 and the read absence end time so as to determine the absent period. The CPU 11 then proceeds to step 116.

In step 116, the CPU 11 reads the scheduled end time of the subject meeting from the meeting-related information database 13C. In step 118, the CPU 11 calculates the time difference between the actual absence end time stored in the storage 13 or the read absence end time and the scheduled end time of the subject meeting so as to determine the remaining time of the subject meeting (hereinafter simply called the remaining time).

In step 120, the CPU 11 refers to the meeting-related information database 13C and judges whether the absent participant has registered scheduled absence information corresponding to the actual absence start time in the meeting-related information database 13C. The CPU 11 then reads from the absence-related information database 13B the presentation format associated with the calculated absent period and remaining time and the registration status of the scheduled absence information. In this manner, the CPU 11 determines the format of content presentation information to be presented to the absent participant when he/she has returned to the subject meeting.

It is assumed that the absence-related information database 13B is the one shown in FIG. 3. When the absent period is 3 minutes and the remaining time is 15 minutes, for example, the format of content presentation information to be presented to the absent participant is determined to be "DOCUMENTATION" regardless of the registration status of the scheduled absence information. In another example, when the absent period is 7 minutes and the remaining time is 15 minutes and when the registration status of the scheduled absence information is "NO", the format of content presentation information to be presented to the absent participant is determined to be "SUMMARY 2".

In step 122, the CPU 11 judges whether the determined presentation format is other than "NOT PRESENTED", that is, whether the content presentation information will be presented to the absent participant. If the result of step 122 is NO, the CPU 11 proceeds step 134. If the result of step 122 is YES, the CPU 11 proceeds to step 124. In step 124, the CPU 11 executes presentation-information generating processing, such as that shown in FIG. 8.

In FIG. 8, in step 150, the CPU 11 reads speech information obtained during the absent period of the absent participant from the storage 13 and converts the read speech information into voice data that can be played back by the speaker 40 of the terminal apparatus 30. At this time point, the absent participant may not have yet returned to the subject meeting (the result of step 106 is NO). In this case, the CPU 11 continues converting the speech information into voice data until the absent participant returns to the subject meeting. The CPU 11 detects whether the absent participant has returned to the subject meeting by executing processing similar to step 106.

In step 152, the CPU 11 judges whether the determined presentation format is one of "DOCUMENTATION", "SUMMARY 1", and "SUMMARY 2". If the result of step 152 is NO, the CPU 11 terminates the presentation-information generating processing. If the result of step 152 is YES, the CPU 11 proceeds to step 154.

In step 154, the CPU 11 converts the voice data obtained in step 150 into text data by using a predetermined voice recognition technology. As the voice recognition technology, a widely known, general technology can be used, and a detailed explanation thereof will be omitted.

In step 156, the CPU 11 judges whether the determined presentation format is "SUMMARY 1" or "SUMMARY 2". If the result of step 156 is NO, the CPU 11 terminates the presentation-information generating processing. If the result of step 156 is YES, the CPU 11 proceeds to step 158.

In step 158, the CPU 11 summarizes the text data obtained in step 154 by using a predetermined document summarizing technology so as to generate first summary data, which indicates a summary of the text data. As the document summarizing technology, a widely known, general technology can be used, and a detailed explanation thereof will be omitted.

In step 160, the CPU 11 judges whether the determined presentation format is "SUMMARY 2". If the result of step 160 is NO, the CPU 11 terminates the presentation-information generating processing. If the result of step 160 is YES, the CPU 11 proceeds to step 162.

In step 162, the CPU 11 reads the speaker information and the time-and-date information associated with the read speech information from the storage 13, and adds the read speaker information and time-and-date information to the first summary data so as to generate second summary data. After step 162, the CPU 11 completes the presentation-information generating processing. The CPU 11 then proceeds to step 126 in FIG. 7.

In step 126, the CPU 11 performs control so that the terminal apparatus 30 of the absent participant plays back one of the voice data, text data, first summary data, and second summary data obtained at the end of the presentation-information generating processing. If data to be played back by the terminal apparatus 30 of the absent participant is voice data, the speaker 40 of the terminal apparatus 30 plays back voice represented by the voice data under the control of the CPU 11. If data to be played back by the terminal apparatus 30 of the absent participant is one of the text data, first summary data, and second summary data, the display 35 of the terminal apparatus 30 displays the corresponding text.

In step 128, the CPU 11 performs control to display a speech playback instruction receiving screen (not shown) on the display 35 of the terminal apparatus 30 of the absent participant. The speech playback instruction receiving screen is used for receiving an instruction to play back the speech during the subject meeting (hereinafter called the subject meeting speech) while one of the voice data, text data, first summary data, and second summary data is being played back in step 126. When the speech playback instruction receiving screen is displayed on the display 35 of the terminal apparatus 30, the absent participant inputs an instruction regarding whether to play back the subject meeting speech.

In step 130, the CPU 11 judges whether the absent participant has given an instruction to play back the subject meeting speech. If the result of step 130 is NO, the CPU 11 proceeds to step 134. If the result of step 130 is YES, the CPU 11 proceeds to step 132.

In step 132, the CPU 11 reads the speech information corresponding to the subject meeting speech from the storage 13, and converts the read speech information into voice data that can be played back by the speaker 40. The CPU 11 then performs control so that the speaker 40 plays back voice represented by the voice data. The CPU 11 then proceeds to step 134.

In step 134, the CPU 11 judges whether the subject meeting has finished. If the result of step 134 is NO, the CPU 11 returns to step 100. If the result of step 134 is YES, the CPU 11 completes the information processing. In the first exemplary embodiment, the CPU 11 judges whether the subject meeting has finished in accordance with whether the current time point has reached the scheduled end time of the subject meeting. However, this is only an example. In another mode, for example, the CPU 11 makes this judgement in accordance with whether the online meeting programs 33A executed in the terminal apparatuses 30 of the individual participants are all closed.

Second Exemplary Embodiment

In the first exemplary embodiment, as the above-described remaining time, the period of time from when an absent participant has returned to an online meeting until the end of the meeting is used. In a second exemplary embodiment, as the remaining time, the ratio between the period of time from the start time of an online meeting to the time at which an absent participant has returned to the online meeting and that from the time at which the absent participant has returned to the online meeting to the end time of the online meeting is used. An example of this mode of the use of the remaining time will be discussed below.

In the second exemplary embodiment, an explanation of portions similar to the first exemplary embodiment will be omitted or be simplified. For example, the configuration of the information processing system 90 according to the second exemplary embodiment is the same as that of the first exemplary embodiment, except for the obtainer 11A. An explanation will thus be given of only the obtainer 11A in the second exemplary embodiment.

As the remaining time, the obtainer 11A in the second exemplary embodiment obtains information indicating the ratio between the period of time from the start time of an online meeting to the time at which an absent participant has returned to the online meeting (hereinafter may be called the absence end time) and that from the absence end time to the end of the online meeting. Hereinafter, the proportion of the period of time from the start time of the online meeting to the absence end time will be called a first proportion, while the period of time from the absence end time to the end of the online meeting will be called a second proportion.

The above-described ratio is used to categorize the remaining time as the multiple levels in the absence-related information database 13B. In the second exemplary embodiment, when the first proportion is 0 to 20% and the second proportion is 100 to 80%, the remaining time is categorized as the long period ("LONG" in FIG. 3). Likewise, when the first proportion is 21 to 79% and the second proportion is 79 to 21%, the remaining time is categorized as the intermediate period ("INTERMEDIATE" in FIG. 3), and when the first proportion is 80 to 100% and the second proportion is 20 to 0%, the remaining time is categorized as the short period ("SHORT" in FIG. 3).

Figure 9:
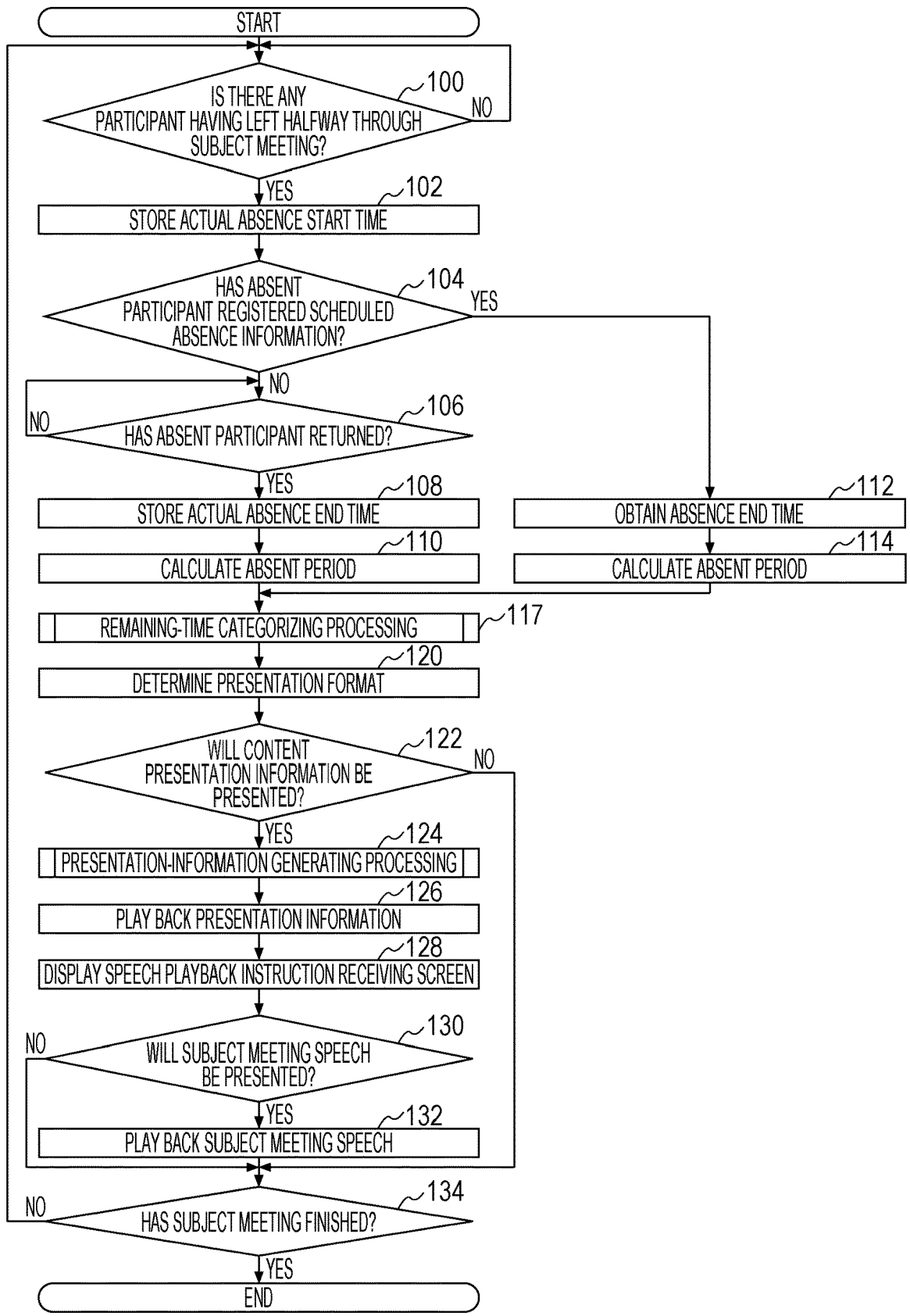
FIG. 9 is a flowchart illustrating an example of information processing according to a second exemplary embodiment.
Figure 10:
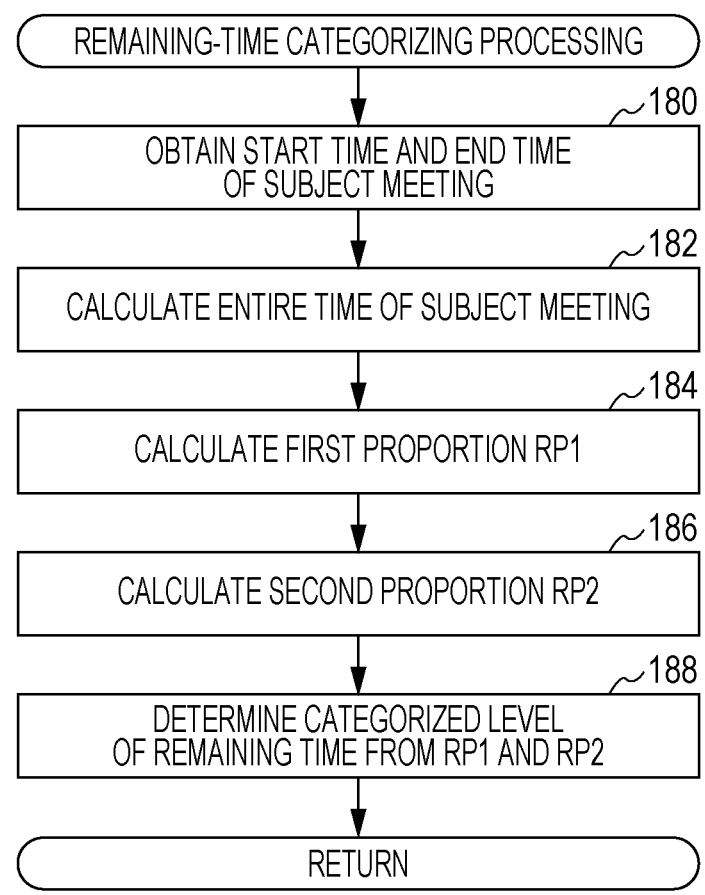
FIG. 10 is a flowchart illustrating an example of remaining-time categorizing processing according to the second exemplary embodiment.

The operation of the information processing apparatus 10 according to the second exemplary embodiment will be discussed below with reference to FIGS. 9 and 10. FIG. 9 is a flowchart illustrating an example of information processing according to the second exemplary embodiment. In FIG. 9, the same steps as those in the first exemplary embodiment are designated by like step numbers and an explanation thereof will be omitted. FIG. 10 is a flowchart illustrating an example of remaining-time categorizing processing according to the second exemplary embodiment.

As shown in FIG. 9, information processing of the second exemplary embodiment is different from that of the first exemplary embodiment only in that step 117 is executed instead of steps 116 and 118 of the first exemplary embodiment.

In the information processing of the second exemplary embodiment, in step 117, remaining-time categorizing processing shown in FIG. 10 is executed.

In FIG. 10, in step 180, the CPU 11 reads the start time and the end time of a subject meeting from the meeting-related information database 13C. In step 182, the CPU 11 calculates the time difference between the read start time and the read end time so as to determine the entire time T of the subject meeting.

In step 184, the CPU 11 calculates the ratio (percentage) of the period of time from the start time of the subject meeting to the actual absence end time obtained in step 108 or the scheduled absence end time obtained in step 112 to the entire time T as the above-described first proportion RP1. In step 186, the CPU 11 calculates the ratio (percentage) of the period of time from the actual absence end time or the scheduled absence end time to the read end time of the subject meeting to the entire time T as the above-described second proportion RP2.

In step 188, the CPU 11 determines as which one of the above-described levels (three levels "LONG", "INTERMEDIATE", and "SHORT" in the second exemplary embodiment) a combination of the first proportion RP1 and the second proportion RP2 is categorized, and then completes the remaining-time categorizing processing.

After the completion of the remaining-time categorizing processing, the CPU 11 proceeds to step 120 in FIG. 9. In step 120, by using the categorized level of the remaining time determined in the remaining-time categorizing processing, the CPU 11 determines the format of content presentation information to be presented to the absent participant, as in the first exemplary embodiment.

In the exemplary embodiments, the above-described information processing is applied to a case in which only one participant leaves halfway through the subject meeting during the same time interval. However, this is only an example. In another mode, for example, the above-described information processing may be applied to a case in which plural participants leave halfway through a subject meeting during the same time interval. In this case, for example, the above-described information processing is executed for each participant leaving halfway through a subject meeting.

The absence-related information database 13B used in the above-described exemplary embodiments is not limited to the one shown in FIG. 3. For example, when the absent period is less than 5 minutes and the remaining time is "LONG", "VOICE OUTPUT" may be selected as the presentation format.

In the above-described exemplary embodiments, regardless of whether a participant has registered scheduled absence information, when this participant leaves a meeting, he/she operates the away button 52D on the online meeting display screen. However, this is only an example. In another mode, for example, if scheduled absence information is registered in advance, a participant may step out of a meeting during the scheduled absent time interval indicated by the registered scheduled absence information without operating the away button 52D on the online meeting display screen. In this case, for example, step 104 is executed at the start of the information processing shown in each of FIGS. 7 and 9, and the subsequent processing is switched in accordance with whether scheduled absence information is registered.

The present disclosure has been discussed through illustration of the exemplary embodiments. However, the disclosure is not restricted to the technical range of the above-described exemplary embodiments. Various modifications and/or improvements may be made to the exemplary embodiments without departing from the spirit and scope of the disclosure. Exemplary embodiments obtained by making modifications and/or improvements are also encompassed within the technical range of the disclosure.

In the above-described exemplary embodiments, information processing is implemented as a result of executing a software program by using a computer. However, information processing may be implemented in a different manner, for example, by using hardware or a combination of hardware and software.

The configuration of the information processing apparatus 10 discussed in the exemplary embodiments is only an example. Unnecessary elements may be deleted or new elements may be added without departing from the spirit and scope of the disclosure.

The procedures of the information processing discussed in the exemplary embodiments are only examples. In each of the procedure, unnecessary steps may be deleted, new steps may be added, or the order of steps may be changed without departing from the spirit and scope of the disclosure.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
    a processor configured to:
        obtain a start time and an end time of an online meeting;
        obtain when a participant has left halfway during the online meeting, an absent period of the participant and a remaining time of the online meeting,
            wherein the absent period is a period of time for which the participant is absent after the participant has left the online meeting,
            wherein the remaining time is a time from when the participant returns to the online meeting until the end time of the online meeting, and
            wherein the online meeting is a meeting conducted via a communication network; and
        switch a format of content presentation information to be presented to the participant having left halfway through the online meeting in accordance with a combination of a time length of the obtained absent period and a time length of the obtained remaining time,
            wherein the content presentation information is information on content of the online meeting during the absent period of the participant.

2. The information processing apparatus according to claim 1, wherein the format of the content presentation information includes at least one of a format of voice generated during the absent period, a format of a document formed from the voice, a format of a summary made from the document, and a format of minutes of the online meeting including the summary appended with information on who and when having spoken in the online meeting.

3. The information processing apparatus according to claim 2, wherein the processor is configured to, when the time length of the remaining time is shorter than a predetermined threshold, the content presentation information is not presented.

4. The information processing apparatus according to claim 3, wherein the remaining time is represented by a ratio between a period of time from the start time of the online meeting to a time at which the participant has returned to the online meeting and a period of time from the time at which the participant has returned to the online meeting to the end time of the online meeting.

5. The information processing apparatus according to claim 3, wherein the processor is configured to:
    detect an absence start time at which the participant has left halfway through the online meeting and an absence end time at which the participant has returned to the online meeting; and
    determine the absent period and the remaining time by using the detected absence start time and the detected absence end time.

6. The information processing apparatus according to claim 2, wherein the remaining time is represented by a ratio between a period of time from the start time of the online meeting to a time at which the participant has returned to the online meeting and a period of time from the time at which the participant has returned to the online meeting to the end time of the online meeting.

7. The information processing apparatus according to claim 2, wherein the processor is configured to:
    detect an absence start time at which the participant has left halfway through the online meeting and an absence end time at which the participant has returned to the online meeting; and
    determine the absent period and the remaining time by using the detected absence start time and the detected absence end time.

8. The information processing apparatus according to claim 1, wherein the remaining time is represented by a ratio between a period of time from the start time of the online meeting to a time at which the participant has returned to the online meeting and a period of time from the time at which the participant has returned to the online meeting to the end time of the online meeting.

9. The information processing apparatus according to claim 8, wherein the processor is configured to:
    detect an absence start time at which the participant has left halfway through the online meeting and an absence end time at which the participant has returned to the online meeting; and
    determine the absent period and the remaining time by using the detected absence start time and the detected absence end time.

10. The information processing apparatus according to claim 1, wherein the processor is configured to:
- detect an absence start time at which the participant has left halfway through the online meeting and an absence end time at which the participant has returned to the online meeting; and
- determine the absent period and the remaining time by using the detected absence start time and the detected absence end time.

11. The information processing apparatus according to claim 10, wherein the processor is configured to detect the absence start time and the absence end time in response to receiving specifying of the absence start time and the absence end time from the participant.

12. The information processing apparatus according to claim 11, wherein the processor is configured to receive the specifying of the absence start time and the absence end time from the participant via a user interface screen.

13. The information processing apparatus according to claim 1, wherein the processor is configured to:
- receive in advance a scheduled time interval for which the participant is planning to be absent from the online meeting; and
- determine the absent period and the remaining time by using the received scheduled time interval.

14. The information processing apparatus according to claim 13, wherein the processor is configured to start creating the content presentation information while the participant is absent from the online meeting.

15. The information processing apparatus according to claim 1, wherein the processor is configured to use, for the content presentation information, information in a format that requires a longer processing time to create, as the absent period is longer and as the remaining time is longer.

16. An information processing method comprising:
- obtaining a start time and an end time of an online meeting;
- obtaining when a participant has left halfway during the online meeting, an absent period of the participant and a remaining time of the online meeting,
  - wherein the absent period is a period of time for which the participant is absent after the participant has left the online meeting,
  - wherein the remaining time is a time from when the participant returns to the online meeting until the end time of the online meeting, and
  - wherein the online meeting is a meeting conducted via a communication network; and
- switching a format of content presentation information to be presented to the participant having left halfway through the online meeting in accordance with a combination of a time length of the obtained absent period and a time length of the obtained remaining time,
  - wherein the content presentation information is information on content of the online meeting during the absent period of the participant.

17. A non-transitory computer readable medium storing a program causing a computer to execute a process, the process comprising:
- obtaining a start time and an end time of an online meeting;
- obtaining when a participant has left halfway during the online meeting, an absent period of the participant and a remaining time of the online meeting,
  - wherein the absent period is a period of time for which the participant is absent after the participant has left the online meeting,
  - wherein the remaining time is a time from when the participant returns to the online meeting until an end time of the online meeting, and
  - wherein the online meeting is a meeting conducted via a communication network; and
- switching a format of content presentation information to be presented to the participant having left halfway through the online meeting in accordance with a combination of a time length of the obtained absent period and a time length of the obtained remaining time,
  - wherein the content presentation information is information on content of the online meeting during the absent period of the participant.

* * * * *